United States Patent
Fukuzato

(10) Patent No.: US 7,187,919 B2
(45) Date of Patent: Mar. 6, 2007

(54) BACKUP METHOD OF APPLICATIONS OF PORTABLE CELLULAR PHONE

(75) Inventor: Atsushi Fukuzato, Tokyo (JP)

(73) Assignee: NEC Corporation, Tokyo (JP)

( * ) Notice: Subject to any disclaimer, the term of this patent is extended or adjusted under 35 U.S.C. 154(b) by 753 days.

(21) Appl. No.: 10/003,384

(22) Filed: Dec. 6, 2001

(65) Prior Publication Data

US 2002/0072350 A1 Jun. 13, 2002

(30) Foreign Application Priority Data

Dec. 8, 2000 (JP) .............................. 2000-374624

(51) Int. Cl.
*H04M 1/66* (2006.01)
(52) U.S. Cl. .................. 455/410; 455/411; 455/556.1; 455/557; 713/169; 713/193; 380/233; 380/231
(58) Field of Classification Search ................ 455/419, 455/558, 420, 433, 557, 5; 710/102, 100
See application file for complete search history.

(56) References Cited

U.S. PATENT DOCUMENTS

| | | | | |
|---|---|---|---|---|
| 5,418,837 A | * | 5/1995 | Johansson et al. .......... 455/558 |
| 5,748,084 A | * | 5/1998 | Isikoff ..................... 340/568.1 |
| 6,311,241 B1 | * | 10/2001 | Hofmann .................... 710/301 |
| 6,324,411 B1 | * | 11/2001 | Genell ........................ 455/561 |
| 6,449,476 B1 | * | 9/2002 | Hutchison et al. .......... 455/418 |
| 6,453,161 B1 | * | 9/2002 | Touati et al. ............... 455/433 |
| 6,484,024 B1 | * | 11/2002 | Darnault et al. ............ 455/418 |
| 6,484,026 B1 | * | 11/2002 | Hagebarth .................. 455/419 |
| 6,496,949 B1 | * | 12/2002 | Kanevsky et al. ............ 714/47 |
| 6,684,324 B2 | * | 1/2004 | Floman et al. ................. 713/1 |
| 6,728,547 B1 | * | 4/2004 | Frank et al. ................ 455/466 |
| 6,772,338 B1 | * | 8/2004 | Hull .......................... 713/168 |
| 6,925,560 B1 | * | 8/2005 | Basquin ..................... 713/169 |

FOREIGN PATENT DOCUMENTS

EP 0 767 426 4/1997

(Continued)

OTHER PUBLICATIONS

European Search Report dated Jun. 29, 2003.

(Continued)

*Primary Examiner*—Temica Beamer
*Assistant Examiner*—Joy Contee
(74) *Attorney, Agent, or Firm*—Whitham, Curtis, Christofferson & Cook, PC

(57) ABSTRACT

A backup method of applications of a portable cellular phone is provided which is capable of preventing the applications from being copied by a person being not an owner of the portable cellular phone.

The application of the portable cellular phone to be backed up is saved in the backup device and, when the application saved in the backup device is used as backup data for the portable cellular phone, a manufacture serial number and/or a phone number of the portable cellular phone are compared and, only when these numbers match each other, the application for the backup is copied in the portable cellular phone.

9 Claims, 5 Drawing Sheets

FOREIGN PATENT DOCUMENTS

| | | |
|---|---|---|
| EP | 09252489 | 9/1997 |
| EP | 0 930 793 | 7/1999 |
| EP | 1 024 674 | 8/2000 |
| EP | 1 128 692 | 8/2001 |
| JP | 8-130569 | 5/1996 |
| JP | 2000-31882 | 1/2000 |
| JP | 2000-69144 | 3/2000 |
| JP | 3072497 | 8/2000 |
| WO | WO 96/00481 | 1/1996 |
| WO | WO 01/41398 | 6/2001 |

OTHER PUBLICATIONS

Documents retrieved from the Internet, XP-00247291 Titled "Identification card systems; Telecommunications IC cards and terminals; Additional Telecommunications Features (ATF)" dated May 1999.
European Office Action dated Jul. 1, 2005.
Forman et al. "The Challenges of Mobile Computing" pp. 38-47; Apr. 1994.
European Office Action dated Aug. 10, 2005.
Japan Office Action dated Nov. 21, 2006 with English translation of relevant passages.

* cited by examiner

BACKUP METHOD OF APPLICATIONS OF PORTABLE CELLULAR PHONE

BACKGROUND OF THE INVENTION

1. Field of the Invention

The present invention relates to a backup method of applications of portable cellular phones and more particularly to the backup method capable of preventing illegal copying of the applications of the portable cellular phones.

The present application claims priority of Japanese Patent Application No. 2000-374624 filed on Dec. 8, 2000, which is hereby incorporated by reference.

2. Description of the Related Art

In recent years a market for portable cellular phones is expanding with increasing speed. Ordinarily, such the portable cellular phones are being sold with necessary applications incorporated internally by a manufacturer of the portable cellular phones. Since types of the portable cellular phones are changed frequently in recent years, as in a case of computers, service of distributing applications of such the portable cellular phones is going to be started.

However, when the application is distributed to each of the portable cellular phones, the application can be copied. Therefore, it presents a problem as to how a copyright on software for the application can be secured. A Java (copyright: Sun Micro Systems Inc.) application, in particular, is downloaded from the Internet so as to be installed on the portable cellular phone, as a result, there is a danger that the application is copied illegally by a person not being an owner (that is, a legal user or an authorized user) of the portable cellular phone.

Moreover, in some cases, a telephone number or applications of the portable cellular phone are lost due to operational error. In such a case, it can be thought that the application can be stored as its backup copy in, for example, a personal computer or a like, however, in this case, there is a danger that the application is copied illegally by persons other than the owner (the legal user or the authorized user) of the portable cellar phone. Accordingly, how the illegal copying of the application can be prevented is become a problem.

SUMMARY OF THE INVENTION

In view of the above, it is an object of the present invention to provide a method for backing up applications of portable cellular phones which is capable of preventing an illegal copying of the applications.

According to a first aspect of the present invention, there is provided a method for backing up applications of a portable cellular phone including:

a step of storing application information to be used in the portable cellular phone and identification information used to identify the portable cellular phone in a backup device;

a step of transferring, when the application information is backed up, the application information with the ID information being added, from the backup device to the portable cellular phone;

a step of the portable cellular phone comparing the transferred identification information with identification information of the portable cellular phone; and a step of copying the application information only when both of the identification information match each other.

In the foregoing, a preferable mode is one wherein the identification information is a manufacture serial number and/or a telephone number of the portable cellular phone.

A preferable mode is one wherein the portable cellular phone performs processing of verifying whether or not the applications transferred from the backup device run normally and does not copy the transferred application if the application does not run properly.

Also, a preferable mode is one wherein the portable cellular phone stores the application information having undergone the verification processing in the portable cellular phone in an executable format.

Also, a preferable mode is one wherein the portable cellular phone terminates processing when the identification information transferred from the backup device does not match the identification information of the portable cellular phone.

Also, a preferable mode is one wherein the portable cellular phone, when it uses the application information being stored in the backup device at a time of changing a type of the portable cellular phone, compares the identification information transferred from the backup device with the identification information of the portable cellular phone and copies the transferred application information only when both of the identification information match each other.

Also, a preferable mode is one wherein, when data is transmitted and/or received between the portable cellular phone and backup device, information indicating a mode is added to the data.

Furthermore, a preferable mode is one wherein the application is a Java application.

With the above configurations, the application to be backed up is saved in the backup device and, when the application is to be transferred as the backup data to the portable cellular phone, the identification information is compared and, only when both of the identification information match each other, the application is copied as the backup data. Therefore, it is possible to prevent the application from being illegally copied by a person not being owner of the portable cellular phone. It is also possible to back up the application without the application being copied illegally and to properly address an accidental event such as loss of the application or a like.

BRIEF DESCRIPTION OF THE DRAWINGS

The above and other objects, advantages, and features of the present invention will become more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
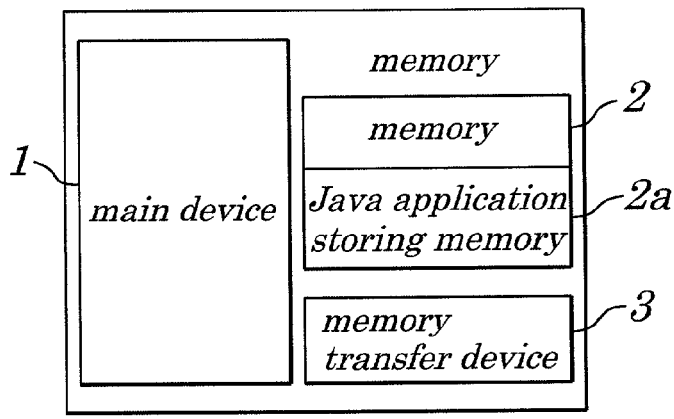
FIG. 1 is a schematic block diagram showing configurations of hardware of a portable cellular phone according to an embodiment of the present invention.
Figure 2:
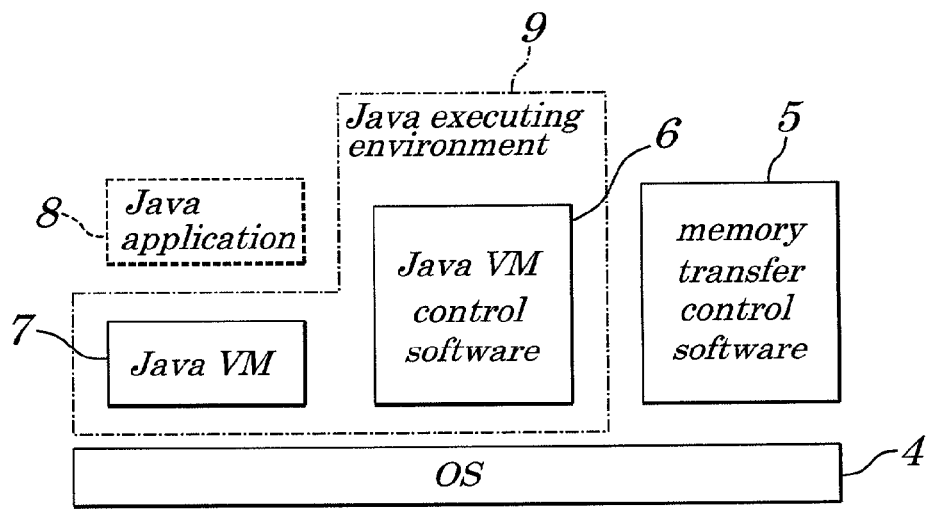
FIG. 2 is a schematic block diagram showing configurations of software of the portable cellular phone according to the embodiment of the present invention.

FIGS. 1 and 2 are schematic block diagrams showing configurations of hardware of a portable cellular phone 14 (shown in FIG. 14) according to an embodiment of the present invention. FIG. 1 shows configurations of hardware of the portable cellular phone 14 and FIG. 2 shows configurations of its software.

First, configurations of the hardware will be described by referring to FIG. 1. The portable cellular phone 14 of the embodiment shown in FIG. 1 chiefly includes a main device 1, a memory 2, and a memory transfer device 3. The main device 1 is a circuit or a mechanism used to implement a function as the portable cellular phone. The main device 1 includes, for example, a circuit used to transmit and/or receive a wireless signal, antenna, speaker, microphone, operating key, liquid crystal display and a like. Configurations of the main device 1 are the same as those in a conventional portable cellular phone (not shown).

A Java (Sun Micro Systems Inc.) application storing memory 2a provides a region used to store application information that has been installed in the portable cellular phone 14. In FIG. 1, a region storing a Java application within the memory 2 is shown as the Java application storing memory 2a. However, the Java application storing memory 2a also has a region to store other applications or a like. The memory transfer device 3 is a device used to transfer data in the Java application storing memory 2a to other devices. Moreover, the Java application 8 represents an application described in a Java language. In the embodiment, the Java application 8 is installed in the Java application storing memory 2a in the portable cellular phone 14.

Next, configurations of software employed in the portable cellular phone 14 of the embodiment will be explained by referring to FIG. 2. As shown in FIG. 2, an operating system (OS) 4 is installed. Though the OS 4 represents a platform, since the Java application 8 itself has a characteristic that it does not depend on the platform, a type of the OS 4 is not limited. A memory transfer control software 5 is software used to acquire Java application information from the Java application storing memory 2a and to control outputs fed to external devices for example, such as a data backup PC 15 (shown in FIG. 4), by using the memory transfer device 3. The memory transfer control software 5 performs processing of judging whether or not the Java application 8 is outputted to the external devices.

Java Virtual Machine (VM) control software 6 is software used to control a start of a Java VM 7 or a like. The Java application 8 is managed by the Java VM control software 6 and the Java application storing memory 2a is associated with the application information. The Java VM 7 is used to run the Java application 8. Since a capacity of a virtual storage installed in the portable cellular phone 14 is smaller when compared with a capacity of a virtual storage employed in the Java VM 7 installed generally in personal computers or a like, the Java VM 7 used in the present invention has only a function intended to be used in the portable cellular phone 14.

The Java application 8 is Java application downloaded from the Internet or a like or software installed from a terminal for backup of the Java application 8. A Java executing environment 9 denotes an environment in which the Java application 8 can be executed. In FIG. 2, the Java executing environment 9 is a generic name of a whole including the Java VM control software 6 and the Java VM 7.

Figure 3:
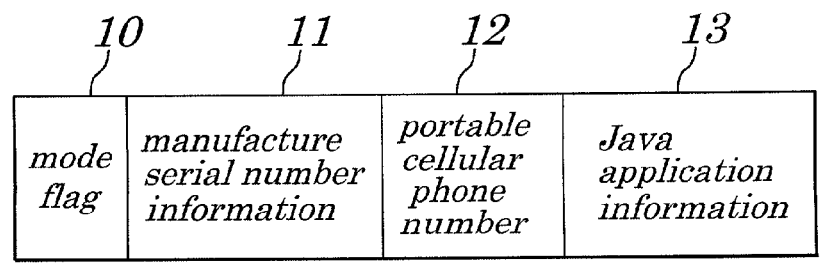
FIG. 3 is a diagram showing a data format used when data is transmitted or received between the portable cellular phone and a personal computer (PC) for backing up data according to the embodiment of the present invention.

FIG. 3 is a diagram showing a data format used when application information is transmitted. The data format shown in FIG. 3 is used when data is transmitted and/or received between the portable cellular phone 14 described later and the data backup PC 15 for application backup. In FIG. 3, a mode flag 10 assigned at a head of the data format is a flag used to set a transfer mode. By the mode flag 10, a flag showing a mode of outputs fed to external terminals, a mode of the application backup, a mode of changing a machine type are set. A manufacture serial number information 11 is a manufacture serial number of the portable cellular phone 14 stored in the portable cellular phone 14. Moreover, a portable cellular phone number 12 is a telephone number that the portable cellular phone 14 has.

A Java application information 13 is application information stored in the Java application storing memory 2 of the portable cellular phone 14. When data is transferred between the portable cellular phone 14 and the data backup PC 15 for the application backup, the data format shown in FIG. 3 is used which includes the mode flag 10, manufacture serial number information 11, portable cellular phone number 12, and Java application information 13.

Figure 4:
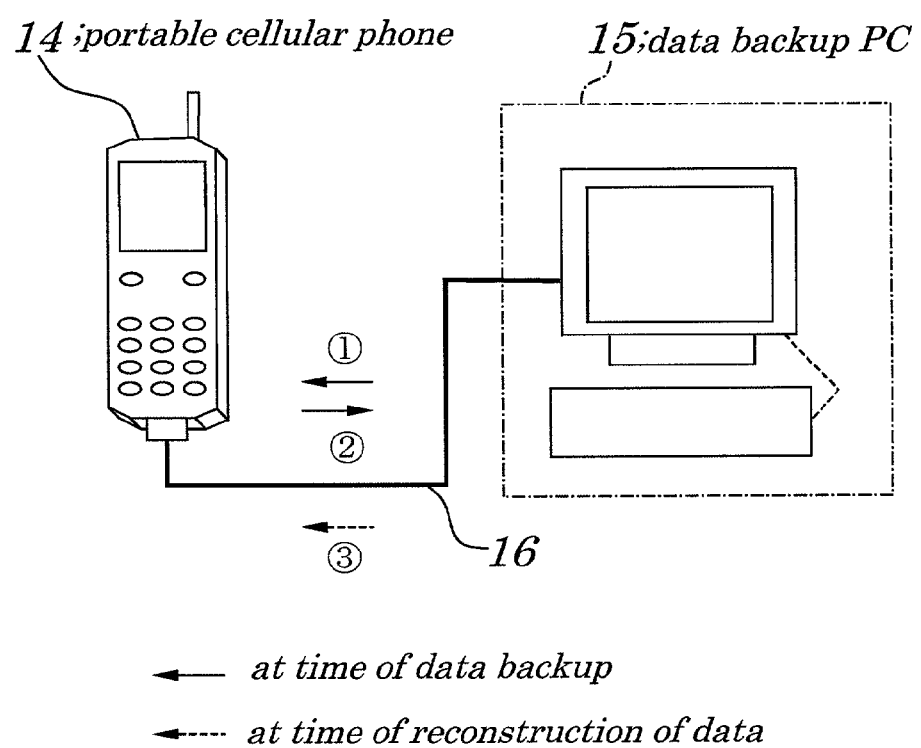
FIG. 4 is a diagram showing a flow of data at a time of backing up data and of reconstruction of data between the portable cellular phone and the PC for data backup according to the embodiment of the present invention.

FIG. 4 is a diagram showing a flow of data at a time of the backup of data and reconstruction of data between the portable cellular phone and the data backup PC 15. The data backup PC 15 is used as a backup terminal to make backups of the Java application 8. The portable cellular phone 14 is connected to the data backup PC 15 and backups of the Java application 8 installed in the portable cellular phone 14 are made. In FIG. 4, arrows indicated by solid lines ① and ② show the flow of data at the time of data backup and an arrow indicated by broken line ③ shows the flow of data at the time of reconstruction of data.

Figure 5:
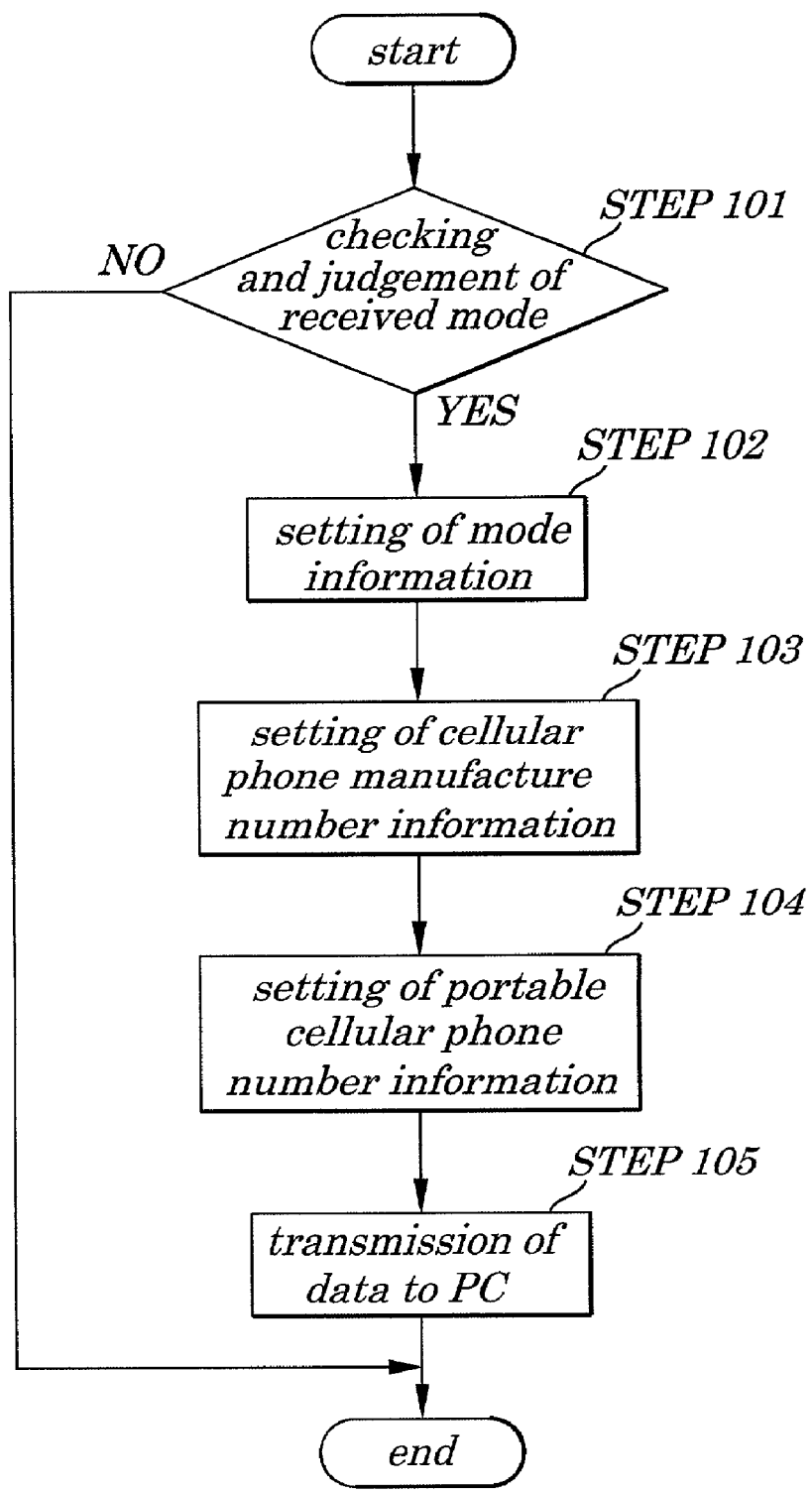
FIG. 5 is a flowchart showing a flow of processing in the portable cellular phone at a time when the portable cellular phone receives a signal indicating an external event for outputting according to the embodiment of the present invention.

When data is backed up or saved by the data backup PC 15, the portable cellular phone 14 is put in a memory transfer mode by a transmission of a predetermined special command from the data backup PC 15 to the portable cellular phone 14. That is, the portable cellular phone 14 is placed in a mode for transferring the Java application 8. At this point, the portable cellular phone 14 recognizes by a signal indicating that the portable cellular phone 14 is placed in the data backup mode and executes processing provided in a flowchart shown in FIG. 5. In FIG. 5, a received mode is checked at Step 101 for judgement, that is, whether or not the received mode is a normal mode for the data backup is judged and, if it is a normal backup mode, a format data for processing of the data backup is created.

The creation of the format data includes processing of setting the mode flag 10 (Step 102), of setting the manufacture serial number of the portable cellular phone 14 (Step 103) and of setting a portable cellular phone telephone number information (Step 104) and the transfer data in the data format shown in FIG. 3 is created. In this case, the backup mode is set as the mode flag 10 because it is for the data backup. After the transfer data is created, data is transferred from the portable cellular phone 14 to the backup PC 15 (Step 105) and the procedures are now terminated. Moreover, if, in Step 101, the received mode is invalid, the processing is terminated and no further processing is performed.

Figure 6:
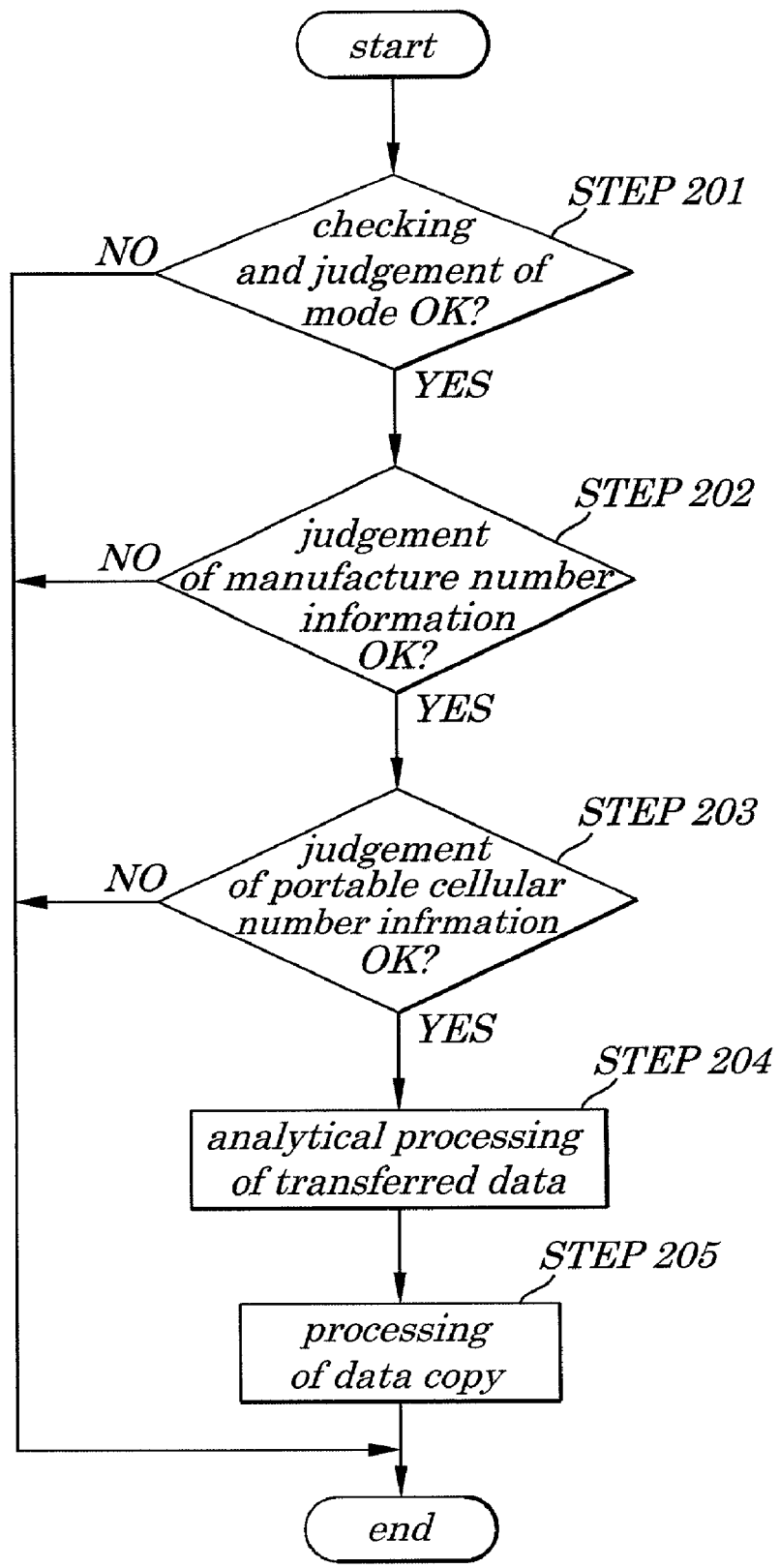
FIG. 6 is a flowchart showing a flow of processing in the portable cellular phone at a time when the portable cellular phone receives data from an external source according to the embodiment of the present invention.

Next, processing to be performed when the backup data stored in the data backup PC 15 is reconstructed in the portable cellular phone 14 is described by referring to a flowchart shown in FIG. 6. The data backup PC 15 transfers the reconstructed data in the data format shown in FIG. 3 to the portable cellular phone 14. Backup data reconstruction mode is set as the mode flag 10. Manufacture serial number information and portable cellular phone number information transmitted from the portable cellular phone 14 are set as the manufacture serial number information 11 and portable cellular phone telephone number information 12, respectively. The Java application information that the data backup PC 15 has is set as the Java application information 13.

The portable cellular phone 14, when receiving the reconstructed data, performs processing in the chart flow shown in FIG. 6. In FIG. 6, the portable cellular phone 14 checks a mode of the transmitted format data (Step 201). At this point, as the mode information, the backup data reconstructing mode is set as described above and the portable cellular phone 14, when receiving this information, is placed in a memory transfer reconstructing mode of the Java application 8. In the memory transfer reconstructing mode, the portable cellular phone 14 makes the judgement of the manufacture serial number information 11, that is, performs a comparison between the transmitted manufacture serial number information 11 and the manufacture serial number information 11 of its own portable cellular phone 14 (Step 202). If the transmitted manufacture serial number information 11 matches the manufacture serial number information 11 of its own portable cellular phone 14, the routine proceeds to Step 203 and the judgement of the portable cellular phone number 12 information is made. That is, the comparison is made between the transmitted portable cellular phone number 12 information and its own portable cellular phone number 12 information and the judgement is performed as to whether both of the portable cellular phone telephone number 12 information match each other.

Now, if both of the portable cellular phone telephone number 12 information match each other, the portable cellular phone 14 performs processing of analysis of the transferred data (Step 204). That is, whether or not the Java application runs properly is verified and additional information being added to the Java application 8 is analyzed so that the Java application 8 having undergone verification processing has a format in which it can be executed in the portable cellular phone 14, that is, in which the portable cellular phone 14 operates. The portable cellular phone 14, when having terminated processing of the verification, performs processing of copying the Java application information 13 having undergone analytical processing onto the memory 2 (Step 205) and terminates processing of reconstructing the Java application information 13. Moreover, if the Java application 8 does not run properly in the verification processing of data, no copying is made.

Thus, according to the embodiment, since the Java application 8 is saved in the backup PC 15, even if the Java application 8 vanishes due to operational error, the Java application 8 can be backed up. Moreover, since the verification processing is made by using the manufacture serial number information and portable cellular phone telephone number 12 information, illegal copying by a person being not an owner (a legal user or an authorized) of the portable cellular phone 14 can be prevented and only the owner of the portable cellular phone 14 is allowed to back up the Java application 8.

Moreover, the analytical processing of data transferred from the data backup PC 15 is performed in the portable cellular phone 14 so as to verify whether or not the Java application 8 runs properly and the Java application information 13 having undergone the verification has the format in which the Java application 8 can be executed and, therefore, if data is invalid, though the data can be transferred, the data cannot be executed and, as a result, double checking of data can be achieved and invalid use of the Java application 8 can be reliably prevented.

Next, a variation of the embodiment of the present invention is described. In the another embodiment, a type of a portable cellular phone 14 is changed. Though the type and/or function of the portable cellular phone 14 is changed, the portable cellular phone 14 number is not changed. Therefore, in the above embodiment, it is impossible to perform a judgment of manufacture serial number information of the portable cellular phone 14. Though the type of the portable cellular phone 14 is changed, since an owner of the portable cellular phone 14 itself remains unchanged, it is possible to transfer a Java application 8 from a data backup PC 15 to a portable cellular phone 14.

In the embodiment, when the type of the portable cellular phone 14 is changed, the Java application 8 saved in the data backup PC 15 is transferred to the portable cellular phone 14 the type of which has been changed. That is, data is transferred in a data format shown in FIG. 3 from the data backup PC 15 to the portable cellular phone 14. In this case, as a mode flag 10, the change in types of the portable cellular phone 14 is set. The portable cellular phone 14, when receiving data, performs processing in as shown in a flow chart shown in FIG. 7.

Figure 7:
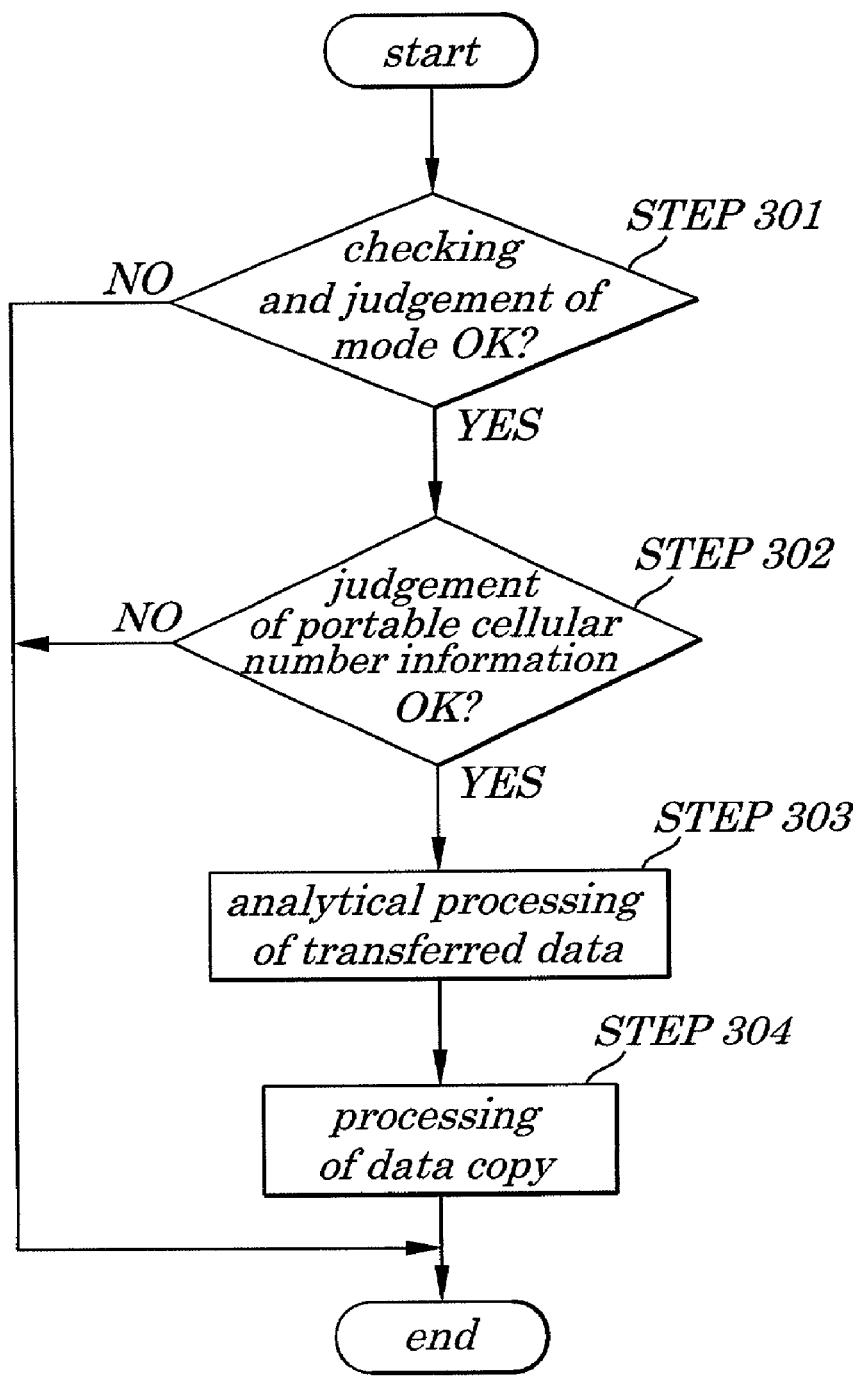
FIG. 7 is a flowchart showing a flow of processing in the portable cellular phone at a time when the portable cellular phone receives data from an external source according to a variation of the embodiment of the present invention.

In FIG. 7, the mode flag 10 is checked and whether or not the mode flag 10 is one for the type change is judged (Step 301). When it is the mode flag 10 for the type change, the portable cellular phone 14 number information is judged, that is, a comparison between the portable cellular phone 14 information transferred from the data backup PC 15 and a portable cellular phone 14 number of its own portable cellular phone 14 is made and whether or not both the portable cellular phone 14 numbers match each other is judged (Step 302). If both the portable cellular phone telephone numbers 12 do not match each other, processing is terminated and no processing of transferring the Java application 8 is performed. Moreover, at this point, unlike in a case shown in FIG. 6, judgment of the manufacture serial number information 11 is not made.

On the other hand, when both the portable cellular phone telephone numbers 12 match each other, as in the case shown in FIG. 6, analytical processing of transferred data is performed (Step 303) and then the transferred Java application 8 is copied as data in a memory 2 (Step 304) and the transfer processing of the Java application 8 is terminated. By the above processing, the transferred Java application 8 is stored in the portable cellular phone 14 in an executable state. Since the processing of transferring data from the portable cellular phone 14 to the data backup PC 15 is the same as that shown in FIG. 5, its description is omitted.

Thus, according to the variation of the embodiment of the present invention, even when the type of the portable cellular phone 14 is changed, the Java application 8 saved in the data backup PC 15 can be used and, at this point, since the checking processing is performed using the portable cellular phone telephone number 12 information, it is possible to prevent a person being not the owner of the portable cellular phone 14 from illegally copying the Java application 8.

It is apparent that the present invention is not limited to the above embodiments but may be changed and modified without departing from the scope and spirit of the invention. For example, in the above embodiments, examples are provided in which the application of the portable cellular phone 14 is backed up by using the data backup PC 15, however, the present invention can be used when an application is distributed as a method for preventing illegal copying.

What is claimed is:

1. A method for backing up and for preventing unauthorized copying of applications of a portable cellular phone comprising:
    a step of storing backup application information to be used in said portable cellular phone and identification information used to identify said portable cellular phone in a backup device;
    a step of transferring, when said application information is backed up, said application information with said identification information being added from said backup device to said portable cellular phone;
    a step of said portable cellular phone comparing the transferred identification information with identification information of said portable cellular phone; and
    a step of copying said backup application information only when both of said identification information match each other, thereby preventing unauthorized copying.

2. The method for backing up and for preventing unauthorized copying of the applications of the portable cellular phone according to claim 1, wherein said identification information is a manufacture serial number and/or a telephone number of said portable cellular phone.

3. The method for backing up and for preventing unauthorized copying of the applications of the portable cellular phone according to claim 1, wherein said portable cellular phone performs processing of verifying whether or not said applications transferred from said backup device run normally and does not copy said transferred application if said application does not run properly.

4. The method for backing up and for preventing unauthorized copying of the applications of the portable cellular phone according to claim 1, wherein said portable cellular phone stores said application information having undergone the verification processing in said portable cellular phone in an executable format.

5. The method for backing up and for preventing unauthorized copying of the applications of the portable cellular phone according to claim 3, wherein said portable cellular phone stores said application information having undergone the verification processing in said portable cellular phone in an executable format.

6. The method for backing up and for preventing unauthorized copying of the applications of the portable cellular phone according to claim 1, wherein said portable cellular phone terminates processing when said identification information transferred from said backup device does not match the identification information of said portable cellular phone.

7. The method for backing up and for preventing unauthorized copying of the applications of the portable cellular phone according to claim 1, wherein said portable cellular phone, when said portable cellular phone uses said application information being stored in said backup device at a time of changing a type of said portable cellular phone, compares said identification information transferred from said backup device with said identification information of said portable cellular phone and copies said transferred application information only when both of said identification information match each other.

8. The method for backing up and for preventing unauthorized copying of the applications of the portable cellular phone according to claim 1, wherein, when data is transmitted and/or received between said portable cellular phone and said backup device, information indicating a mode is added to said data.

9. The method for backing up and for preventing unauthorized copying of applications of the portable cellular phone according to claim 1, wherein said application is a Java application.

* * * * *